United States Patent [19]

Okada

[11] Patent Number: 4,590,365
[45] Date of Patent: May 20, 1986

[54] AUTOMATIC TRANSACTION SYSTEM

[75] Inventor: Toshihiko Okada, Tokyo, Japan

[73] Assignee: Oki Electric Industry Co., Ltd., Tokyo, Japan

[21] Appl. No.: 636,164

[22] Filed: Jul. 31, 1984

[30] Foreign Application Priority Data

Aug. 1, 1983 [JP] Japan ................. 58-139504

[51] Int. Cl.$^4$ ............................................. G06F 15/30
[52] U.S. Cl. ..................................... 235/379; 235/492
[58] Field of Search ............... 235/380, 492, 379, 382, 235/382.5

[56] References Cited

U.S. PATENT DOCUMENTS

| | | | |
|---|---|---|---|
| 3,934,122 | 1/1976 | Riccitelli | 235/380 |
| 4,001,550 | 1/1977 | Schatz | 235/492 |
| 4,197,986 | 4/1980 | Nagata | 235/379 |
| 4,367,402 | 1/1983 | Giraud | 235/380 |
| 4,484,304 | 11/1984 | Anderson | 235/380 |

Primary Examiner—Harold I. Pitts

Attorney, Agent, or Firm—Peter L. Berger

[57] ABSTRACT

The present invention relates to an automatic transaction system for performing transactions with an automatic transaction apparatus, by using identification cards (hereinafter referred to as "ID cards") for an automatic teller system, a credit card system or other various maintenance systems. At least one integrated circuit (hereinafter referred to as "IC") is built in an ID card, a program for practicing such processings as editing, ciphering, operation and checking of data necessary for determining whether or not a transaction should be made is stored in the IC, a center apparatus is connected to the automatic transaction apparatus, transaction data files for customers are contained in the center apparatus, a predetermined program processing of data corresponding to the ID card, which are contained in the center apparatus, is carried out, whether or not a transaction should be made is judged by the center apparatus based on the result of the program processing, and the result of the judgement is transmitted to the automatic transaction apparatus.

2 Claims, 3 Drawing Figures

AUTOMATIC TRANSACTION SYSTEM

BACKGROUND OF THE INVENTION (1) Field of the Invention:

The present invention relates to an automatic transaction system for an automatic transaction apparatus for deposit and payment of cash and the like, in which a transaction can be performed with safety by using ID cards.

(2) Description of the Prior Art:

In the conventional automatic transaction apparatus, whether or not a transaction is correct is judged by the automatic transaction apparatus based on data of a magnetic card. The intended transaction is then performed. Even in the case where data of a magnetic card are ciphered, judgement of the correctness of the transaction is made by the automatic transaction apparatus or an apparatus connected to a circuit thereof. This conventional automatic transaction apparatus has the following defects.

Since a technical operator or expert of the automatic transaction apparatus knows the contents of data, he can perform a wrongful transaction. Furthermore, the contents of data can be known from a magnetic card according to the present advanced technique, and therefore, a stolen or lost card can be used.

SUMMARY OF THE INVENTION

At least an IC is built in an ID card, and a program for practicing such processings as editing, ciphering, operation and checking of data of a customer is stored in the IC. According to the automatic transaction system of the present invention, a center apparatus having a customer's data files or a sub-center apparatus comprising a controller is connected to an automatic transaction apparatus. The above-mentioned program processing is carried out by an ID card of a customer inserted in the automatic transaction apparatus according to instructions of the center apparatus or sub-center apparatus to judge the rightness of the transaction.

A primary object of the present invention having the above-mentioned structure is to increase the secrecy of data necessary for checking the correctness of a transaction by an ID card having at least an IC built therein.

A second object of the present invention is to improve the secrecy of transaction data by arranging an automatic transaction apparatus so that the automatic transaction apparatus can be operated while excluding a technical operator or expert on the maker side from issuing ID cards based on the program of a center apparatus.

A third object of the present invention is to provide an automatic transaction system in which the working method can be changed even during the working of an automatic transaction apparatus, so that even if a third person becomes aware of transaction data, such data can be immediately changed and the safety in the working of the automatic transaction apparatus can be improved.

DETAILED DESCRIPTION OF THE PREFERRED EMBODIMENTS

An embodiment of the present invention for attaining the above objects will now be described in detail with reference to the accompanying drawings.

Figure 1:
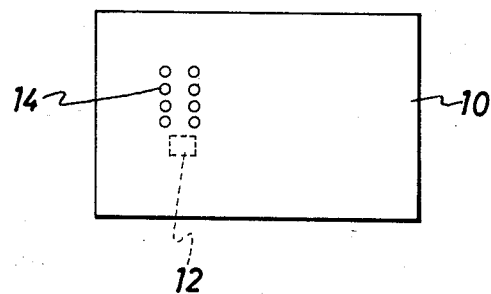
FIG. 1 is a plane view showing an ID card having an IC built therein.

FIG. 1 shows an ID card having an IC built therein. Reference numeral 10 represents an ID card and reference numeral 12 represents an IC for storing programs for editing, ciphering, operation and checking of data necessary for customer's transactions and practicing program processings. The IC 12 includes a microprocessor, a program for the microprocessor (hereinafter referred to as "CPU"), a read-only memory (hereinafer referred to as "ROM") for storing a working storage to be used for the program, a data memory for storing instructions or data received from an automatic transaction apparatus and a memory which becomes necessary during the processing. The IC 12 is actuated by an external power source or the like to perform the processing operation. Reference numeral 14 represents a connection portion between the IC 12 and other apparatus, that is, an automatic transaction machine in which the ID card 10 is inserted.

Figure 2:
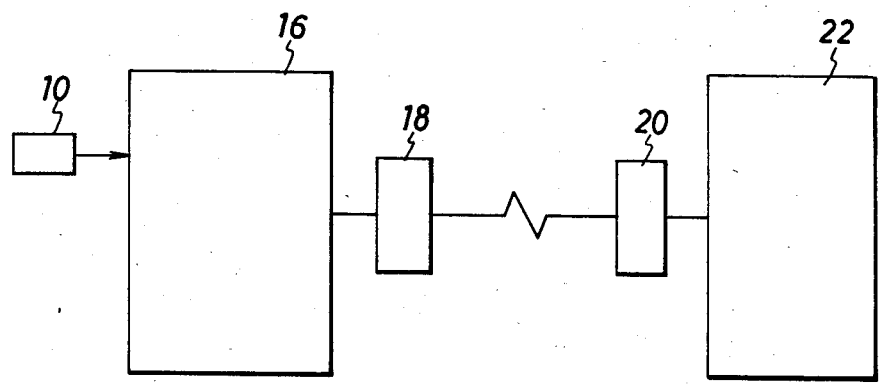
FIG. 2 is a diagram illustrating the structure of an apparatus for the automatic transaction system of the present invention.

FIG. 2 is a diagram illustrating the apparatus structure.

Reference numeral 16 represents an automatic transaction apparatus in which the ID card 10 is inserted to effect deposit and disbursement of bills. Each of reference numerals 18 and 20 represents a circuit control unit and reference numeral 22 represents a center apparatus having a customer's data files.

Figure 3:
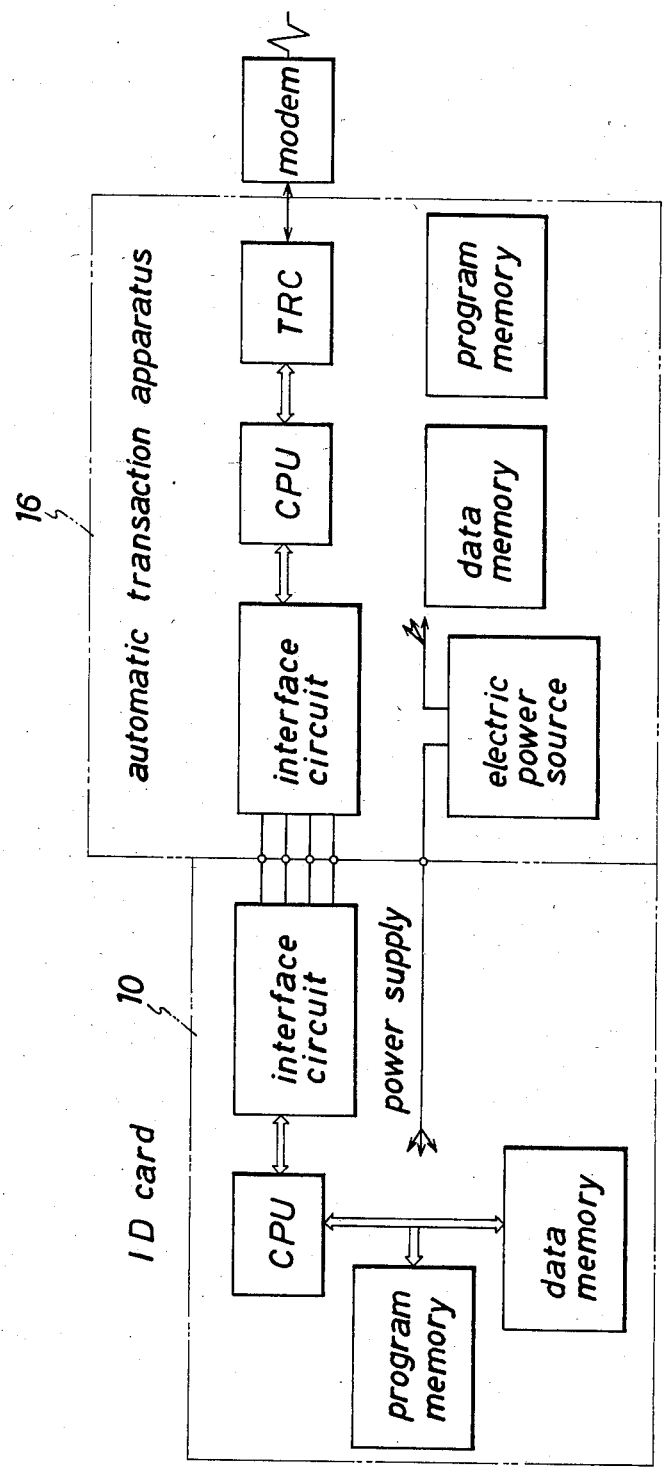
FIG. 3 is a diagram illustrating a circuit structure.

FIG. 3 is a circuit structure diagram.

The operation according to the automatic transaction system of the present invention will now be described.

When the ID card 10 is inserted in the automatic transaction apparatus 16, the connecting portion 14 of the IC 12 of the ID card 10 is connected to the automatic transaction apparatus 16 and a signal of completion of insertion of the ID card 10 is transmitted to the center apparatus 22 through the circuit control units 18 and 20.

The center apparatus 22 which has received the signal of completion of insertion of the ID card 10 transmits instructions for a program processing for confirming correctness of the transaction to the automatic transaction apparatus 16 and the ID card 10 through the circuit control units 18 and 20.

The program processing of the ID card 10 is performed by the IC 12 built in the ID card 10. Namely, the processing instruction of the center apparatus 22 is put in an interface circuit of the IC 12 from an interface circuit of the automatic transaction apparatus 16 through the connecting portion 14. Power is supplied to the IC 12 from an electric power source is the automatic transaction apparatus 16 and the CPU of the IC 12 begins practice of the program stored in the ROM. According to this program, in order to obtain data having a specific relation to the ID number, which are necessary for judging the correctness of the transaction, operation of the data read out from the data memory of the IC 12, such as addition or subtraction, editing such as listing, or ciphering by a specific algorithm is performed. In order to prevent deciphering of the ID number, it is preferred that this operation, editing or ciphering be complicated.

The contents of the processed data of the IC 12 of the ID card 10 are transmitted from the interface portion to the automatic transaction apparatus 16, and the apparatus 16 transmits the data directly to the center apparatus 22. On receipt of the data of the IC 12, the center apparatus 22 deciphers the data and judges whether or not the transaction is possible. If it is judged that the transaction is possible, the instruction of the transaction is transmitted to the automatic transaction apparatus 16. According to the instruction from the center apparatus 22, the automatic transaction apparatus 16 performs the transaction.

As is apparent from the foregoing description, according to the present invention, even if the automatic transaction apparatus 16 does not perform the process of judging whether the transaction is possible or not, the safety of the transaction can be increased.

As described in detail hereinbefore, according to the automatic transaction system of the present invention, at least an IC is built in an ID card and a center apparatus having the above-mentioned function is disposed. By dint of this structural feature, the following effects can be attained according to the present invention.

In the first place, since the judgement of the correctness of the transaction is performed by the IC and center apparatus instead of the automatic transaction apparatus which is used for this purpose according to the conventional technique, a technical operator or expert on the maker side does not participate in issuance of ID cards or formation of processing programs for the center apparatus, and hence, the effect of improving the secrecy of transaction data in a company or financial agency using the automatic transaction apparatus can be attained.

In the second place, since the working method can be changed during the working of the automatic transaction apparatus, even if a third person becomes aware of transaction data, such data can be immediately changed and the safety of the working of the automatic transaction apparatus can be increased.

In the third place, since an information judging mechanism need not be attached to the automatic transaction apparatus, the structure of the automatic transaction apparatus can be simplified.

In the fourth place, since the contents of data transmitted between the ID card and center apparatus cannot be known, wrongful working by a technical operator or expert on the maker side or other third person can be prevented, and hence, working safety can be increased.

As is seen from the foregoing description, the present invention provides an automatic cash transaction system for a financial agency or the like, which is practically very advantageous.

What is claimed is:

1. An automatic transaction system for performing transactions with an automatic transaction apparatus when an ID card is inserted within said automatic transaction apparatus, comprising:
   an integrated circuit built into the ID card, said integrated circuit having means for storing at least one program used for processing data by at least one of editing, ciphering, operating on and checking said data necessary to determine whether or not a transaction should be made;
   a center apparatus connected to the automatic transaction apparatus, said center apparatus containing transaction data for different customers;
   means in said integrated circuit for carrying out a predetermined program processing of the data corresponding to the ID card;
   means in said center apparatus for judging whether or not a transaction should be made as a result of the predetermined program processing; and
   means for transmitting the result of the judgment to the automatic transaction apparatus to control operation of said automatic transaction apparatus.

2. An automatic transaction system according to claim 1, wherein the center apparatus comprises a sub-center apparatus comprising a controller.

* * * * *